W. R. WILLIAMS.
VEHICLE SUSPENSION.
APPLICATION FILED JAN. 22, 1912.
1,426,529.
Patented Aug. 22, 1922.
3 SHEETS—SHEET 1.
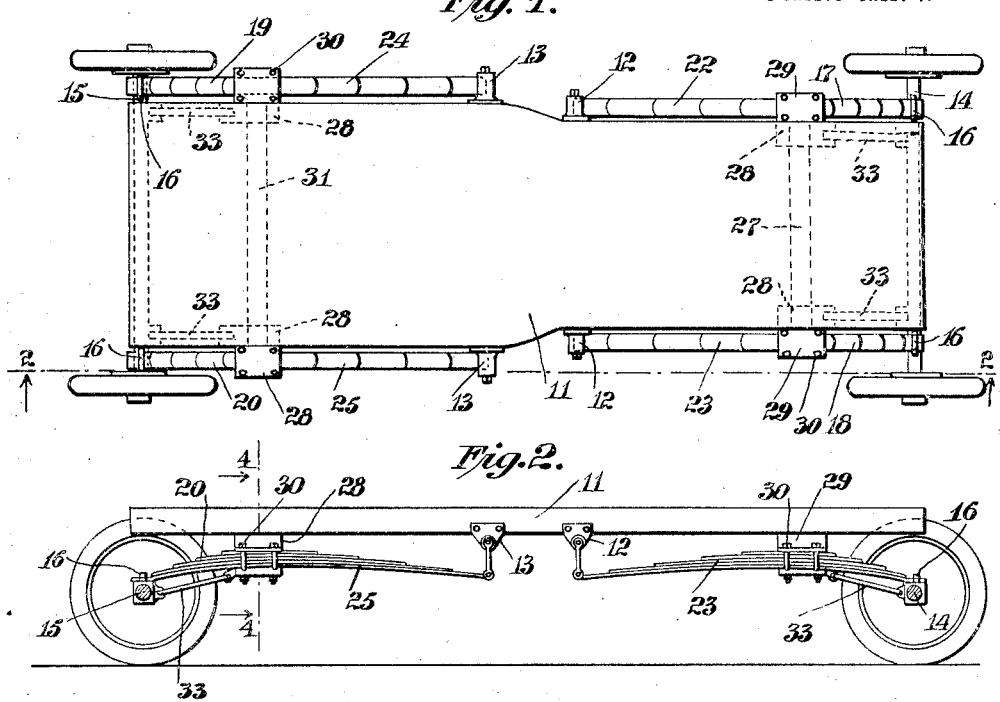
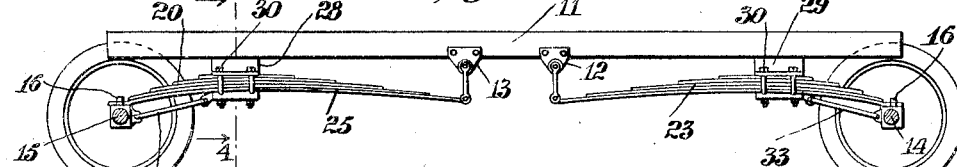
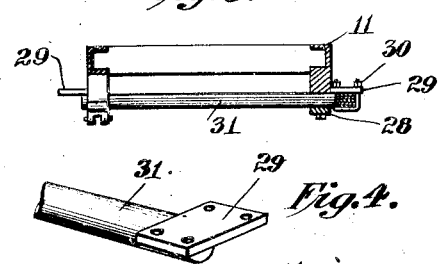
Attest:
Inventor:
William R. Williams,
by Wm. J. Dolan, Atty

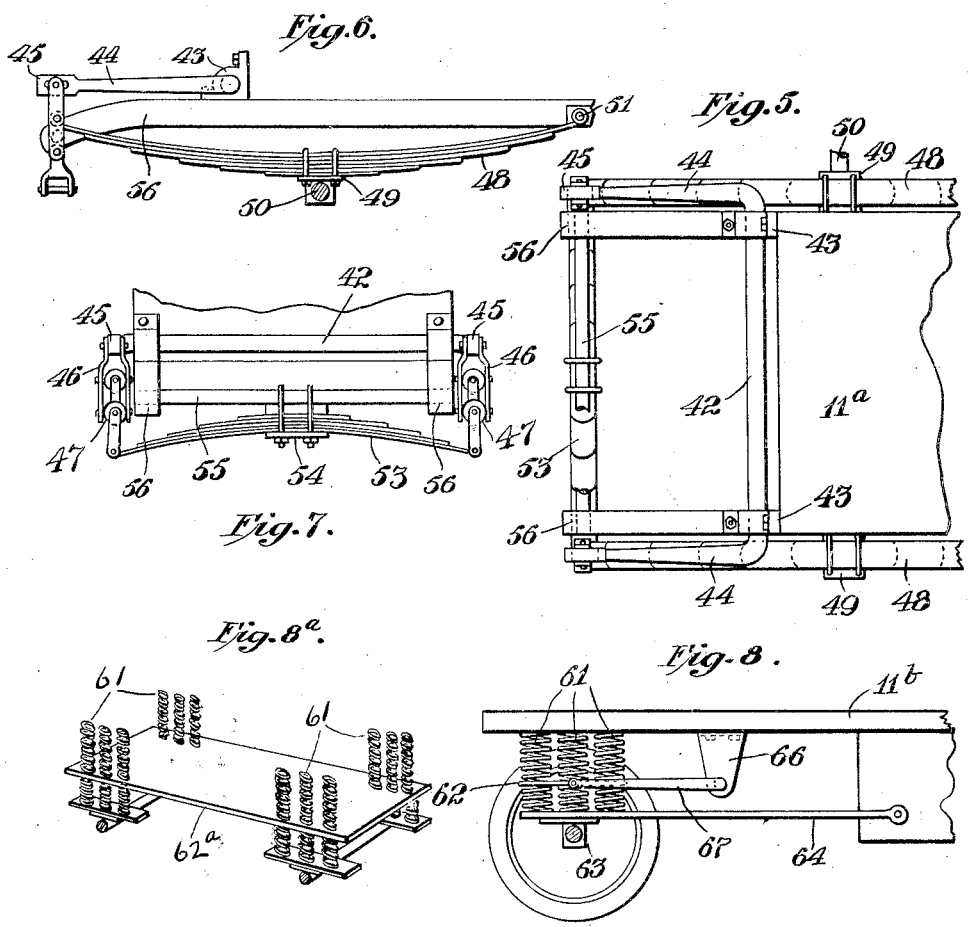

W. R. WILLIAMS.
VEHICLE SUSPENSION.
APPLICATION FILED JAN. 22, 1912.

1,426,529.

Patented Aug. 22, 1922.
3 SHEETS—SHEET 3.

UNITED STATES PATENT OFFICE.

WILLIAM R. WILLIAMS, OF NEW YORK, N. Y.

VEHICLE SUSPENSION.

1,426,529.   Specification of Letters Patent.   Patented Aug. 22, 1922.

Application filed January 22, 1912. Serial No. 672,768.

*To all whom it may concern:*

Be it known that I, WILLIAM R. WILLIAMS, a citizen of the United States, and a resident of New York, county and State of New York, have invented certain Improvements in Vehicle Suspensions, of which the following is a specification.

The invention relates to vehicle suspensions; and, while it may be applied to vehicles generally, it is particularly applicable to road vehicles of heavy weight and designed to move at high speed, as motor cars.

Objects of the invention are to provide an improved form of vehicle suspension in which the degree of action of the elastic elements or springs may be greatly increased without in any degree decreasing the stability of the vehicle; which shall be simple, durable, and economical in construction and highly efficient in operation; and whose parts shall be few, accessible, and easy of application. These and other objects of the invention will in part be obvious and in part be more fully explained in the following description.

The invention consists in the novel improvements, parts, combinations, and features of construction herein shown and described.

In the accompanying drawings, which are referred to herein and form part hereof, are illustrated several embodiments of the invention, the same serving in connection with the description herein to explain the principles of the invention.

Of the drawings:

Fig. 1 is a plan view of the chassis of a motor car, showing an embodiment of the invention applied thereto;

Fig. 2 is a side elevation of the same, taken on the line 2—2 of Fig. 1;

Fig. 3 is a vertical sectional view of a detail, taken on the line 4—4 of Fig. 2;

Fig. 4 is a perspective view of a detail of the fastening member shown at the right in Fig. 3;

Fig. 5 is a plan view of the rear portion of a chassis, showing applied thereto a modification of the embodiment illustrated in Fig. 1;

Fig. 6 is a side elevation of the same;

Fig. 7 is a rear elevation of the same, parts being broken away;

Fig. 8 is a side elevation of a modification;

Figure 9:
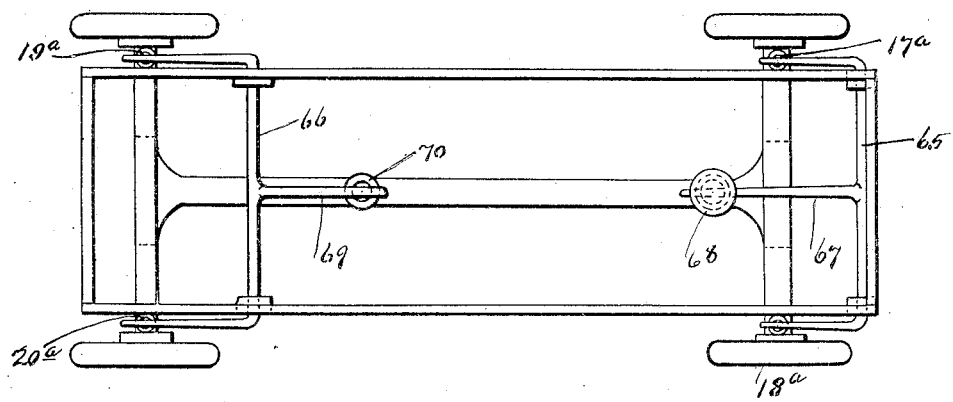
Figure 10:
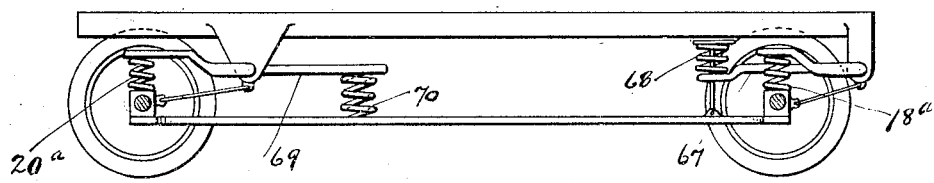

Fig. 8$^a$ is a perspective view of a modification;

Fig. 9 is a plan view of a modification;

Fig. 10 is a side elevation of the same; and

Figure 11:
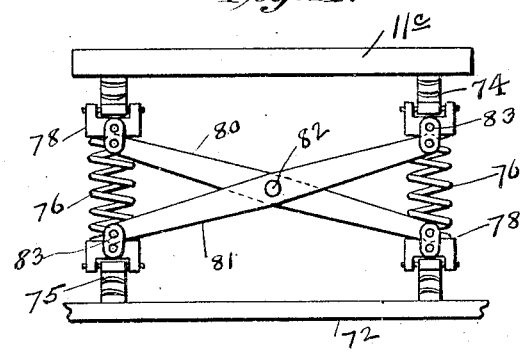

Fig. 11 is an elevation of a modification.

Referring now in detail to the drawings, there is shown in Fig. 1 a chassis 11 of a motor car of a common type. As ordinarily constructed, the car is provided with springs to give a certain degree of ease of motion to the vehicle. In order, however, to insure the stability of the suspended portion or body of the vehicle, these springs must be very rigid. This rigidity constitutes a serious defect in motor vehicles in which a high degree of ease of motion is desirable but which is prevented by this rigidity of the springs or elastic elements. In the construction illustrated in Fig. 1 the chassis 11 is mounted upon fore and aft springs which are respectively mounted at their inner ends in shackles 12, 13 attached to the chassis and which respectively bear upon transversely stable elements of support, as axles 14 and 15 in a usual manner and which are held from displacement by clips 16. The degree of rigidity of the springs of the usual suspension above alluded to may be represented by the portions 17, 18 and 19, 20 of the respective fore and aft springs, as heretofore mounted. To give a desired degree of ease of motion to the vehicle, when running at high speed or upon encountering inequalities of road surface, longer or more flexible springs may be used, the increase in length or flexibility being represented by the portions 22, 23 and 24, 25 of the respective springs. With springs of this degree of flexibility applied in an ordinary manner, however, while great ease of motion would be imparted, the suspended portion of the vehicle would tilt laterally or sway from side to side in a very dangerous manner upon any shifting of the load or upon encountering inequalities in the road surface.

This extreme length of spring or degree of action of the elastic elements can be employed, however, without any attending excessive lateral tilting of the body of the vehicle, if the vehicle suspension is so constructed or arranged that the instability which, would otherwise be caused by the addition of the extra springs or amplification of the elastic means, is eliminated by causing portions of oppositely disposed elastic elements to act in unison. For example, in the embodiment of the invention illustrated in Fig. 1 the forward springs are connected by a member 27 rotatably secured to the chassis 11 by bearings 28. It will be observed that the member 27 is rigidly secured in a manner presently to be described to each of the opposite springs at that point which marks the limit of flexibility or allowable spring action which can be given to the spring, as heretofore used and above explained, namely, the point marking the division between the parts 17 and 22 and 18 and 23, respectively. It will also be noted that the opposite springs are thus interlocked and that as the member 27 is inflexible, any stress communicated, for instance, to the portion 17 of the spring will through the tendency of the member 27 to rotate be communicated to the portion 22 of the spring and also to the portion 23 of the opposite spring but not to the portion 18 of the latter spring. In other words, any stress imparted to one spring is approximately equally imparted to the opposite spring with some coincident relaxation of the stable section of the latter spring, if obstruction or depression affects one wheel only. In this way approximately parallel motion will be maintained by the suspended portion of the vehicle, the axle, or both, to the extent of movement due to the flexing of sections 22 and 23; and, while said body or axle will be free to move together and apart to a degree to insure the desired ease of motion, this motion will always to said extent be approximately parallel. As shown, the member 27 is rigidly fastened to each of the opposite springs by a member comprising a plate 29 and yokes 30 in a usual manner. It will also be noted that the forward suspension is, in the embodiment illustrated, duplicated at the rear, a rigid bar 31 connecting the two opposite rear springs. Reach bars 33, connected each at one end to the rotating member or, as shown, to the frame and at the other end to the axle maintain the longitudinal positions of the respective axles.

In the particular embodiment of the invention illustrated and described the connection between the springs or elastic elements is described as being made with each spring at the point marking the limit of flexibility or allowable spring action which can be given to the spring without affecting the equilibrium of the vehicle body. It should be noted, however, that the invention is not limited to making the connection at this point, as such connection may be made at any point indicating a predetermined degree of ease of motion which it is desired to impart to the vehicle without affecting its equilibrium. Under stress the so-called rigid interlocking means becomes in effect a portion of the elastic means. In Figs. 6, 7, and 8 is illustrated a modification of the invention which can be conveniently applied to certain types of motor cars, as now constructed. In this embodiment of the invention, as shown, the member connecting the springs on opposite sides of the car is made in the form of a yoke, having a main central portion 42 extending transversely of the back of the chassis 11ª and rotatably secured thereto in a suitable manner, as by clips 43. Said yoke also has arm portions 44 extending outwardly and at right angles to the portion 42, and each of said arms has at its outer end a slotted portion 45. In each slotted end 45 is bolted a depending shackle 46, and to each shackle is secured the outer end of one of a pair of springs 48 which are arranged at opposite sides of the chassis and secured at their centers by yokes 49 to an axle 50 and at their inner ends by bolts 51 to the frame. While in practice perfect transverse parallel motion of a portion of the vehicle to the extent of movement due to a third amplifying spring, presently to be referred to, may not be obtained because of the construction of the mechanism, yet such motion should be maintained approximately parallel. The slots in the ends 45 are extended to a suitable degree to compensate for the distortion of the springs. To give additional ease of motion a spring 53 is arranged transversely of the vehicle between the shackles 46, to which it is secured at its ends by shackle and universal joints 47, being secured at its center by yoke 54 to a bar 55 which is secured at its opposite ends to the rearwardly projecting bars 56 of the chassis. It is obvious that this suspension may be duplicated at the forward end of the vehicle, and that proper stops for the springs may be provided, as by the frame ends.

Springs of different form and arrangement to which the yoke may be applied are illustrated in Fig. 10 in which, instead of the horizontal springs of Fig. 1, are shown vertically disposed helical springs arranged to act as a unit. While these springs may vary in number and arrangement and be united in a suitable way, as shown, three vertically disposed helical springs 61 are arranged on one side of the vehicle and are rigidly connected to a plate 62 horizontally arranged transversely of the springs. These springs support on their upper ends the body 11ᵇ of the vehicle, and their lower ends are suitably engaged by a member immediately above the axle 63 which is also connected to the vehicle by reach bar 64. Said springs and other members are duplicated on the opposite side of the vehicle, and between the two sets of springs on opposite sides of the vehicle extends a yoke generally similar to that illustrated in Fig. 6 and rotatably secured or mounted in bearings on the car, one of which 66 is shown. Each of the pair of arms 67 of the yoke is pivotally secured to a plate 62. The portions of the springs beneath the plates 62 may be taken to indicate the degree of rigidity required in the springs, as heretofore used, to insure stability of the vehicle. By employing my invention, however, the added degree of flexibility indicated by the portions above the plates may be imparted without affecting the transverse stability of the vehicle. It will be noted that this is accomplished by maintaining between the elastic elements on the opposite sides of the vehicle, as shown the several sets of springs, the predetermined relation between the points of demarcation in the respective groups of springs between stability and instability, that is, the points marking the limits of flexibility in the springs, as heretofore used and as above explained, at which the body of the vehicle would be stable when moving at speed.

This idea is very clearly set forth in Fig. 8ª in which the various groups of springs 61 are shown as connected by a platform 62ª at the said limiting points, the upper portions of the springs being designed to receive aother platform, not shown.

It will be obvious that different modifications of the invention may be used together on the same vehicle, one modification being used, for example, on the front of the vehicle and another modification at the rear.

It will be observed that in the embodiments of the invention hereinbefore illustrated and described the increased spring action given to the device has been imparted by increasing the length of the supporting springs. My invention, however, is not confined to amplifying the elasticity of the device by so increasing the length of the supporting springs but contemplates that such increase of the elastic elements may be effected by locating the means for effecting such increase at any desired place where stress communicated to any supporting element may be transmitted by the rigid or interlocking member to the means forming the amplification of the elastic means. For example, the degree of elasticity which heretofore could be given to an elastic element without affecting the aquilibrium of the vehicle and which hereinbefore has been represented by the portions 17, 18, 19, 20 of the springs illustrated in Fig. 1 are in Figs. 9 and 10 represented by the helical springs 17ª, 18ª, and 19ª and 20ª, respectively. It will be noted that these pairs of springs are connected by rigid yoke members 65ª and 66ª, respectively. The said yoke 65ª, as shown, has an inwardly extending bar 67ª which connects with a helical spring 68 so that any stress communicated, say to the spring 17ª will be transmitted to said spring 68, and the elasticity of the device is amplified in the same manner as if the spring 17ª were increased in flexibility instead of providing the springs 68. In other words, the spring 68 corresponds to and performs the same function as the portions 22 and 23 of the springs shown in Fig. 1. Similarly, the yoke 66ª is provided with a bar 69 which connects with a spring 70 which bears the same relation to the springs 19ª and 20ª that the portions 24 and 25 bear to the portions 19 and 20 of the springs shown in Fig. 1.

In order to emphasize the diversity of modifications in which the invention can be embodied, there is illustrated in the drawings, see Fig. 11, another modification in which a double connection is established between distinct elastic supporting elements. As here shown, the chassis 11ᶜ is supported at one end by a pair of supporting elements arranged between the chassis and the axle 72 each said element comprising a pair of leaf springs 74 and 75 and a helical spring 76 connected as by suitable blocks 78. The opposite elastic elements are connected by diagonally crossed levers 80 and 81 which are fulcrumed by pin 82. The levers are suitably connected to the springs as by shackles 83 which are pivotally mounted in the blocks 78 and which thus permit the movement laterally of the levers 80 and 81. In this embodiment, the degree of rigidity in the elastic supporting elements necessary to maintain the equilibrium of the vehicle body is represented by the leaf springs 74 and 75 and the connecting members by the levers 80 and 81, the increased flexibility permitted by the invention being represented in the helical springs 76.

It will be seen that a vehicle suspension constructed in accordance with this invention will carry out the objects of the invention as hereinbefore mentioned, while possessing other advantages which will be apparent to those skilled in the art.

The invention in its broader aspects is not limited to the precise constructions shown and described nor to any particular construction by which the same may be carried into effect, as many changes may be made in the details without departing from the main principles of the invention and without sacrificing its chief advantages.

I claim:

1. In a wheeled vehicle, the combination with the body thereof and an axle, of differential semi-elliptic springs interposed between said body and axle on opposite sides of the vehicle, a transverse shaft journaled in bearings of the body and rigidly connected with the less flexible portions of said springs, the latter having each a loose connection with the axle at one end, and reachbars extending from the axles to the opposite ends of said shaft.

2. A vehicle suspension including leaf springs composed each of two sections of unequal lengths arranged at opposite sides of the vehicle in cooperative relation with the body thereof and an axle, and means adapted to transmit stress from one to another of the shorter sections of said springs.

3. A vehicle suspension including, in combination with the body of the vehicle and an axle, leaf springs composed each of unequal sections interposed between said body and said axle at opposite sides of the vehicle, and a rocking member rigidly connecting said springs between the longer and shorter sections thereof from bearings on the body.

4. A vehicle suspension including, in combination with the body of the vehicle and an axle, leaf springs composed each of unequal sections interposed between said body and said axle at opposite sides of the vehicle, and a rocking member mounted in bearings on the body, rigidly connecting the springs between the longer and shorter sections thereof.

5. In a vehicle, the combination with the body thereof and an axle, of leaf springs composed each of sections of unequal length located on opposite sides of the vehicle, the shorter section of each spring being attached at one end to the axle while the longer section of the same connects at the other end with the vehicle body, and a member on the body rigidly connected with said springs transversely thereof.

6. In a vehicle, the combination with the body thereof and an axle, of a pair of leaf springs each composed of sections of unequal length positioned on opposite sides of the vehicle, and a transverse member on the body having rigid connections with the springs between the sections thereof, whereby under rolling movements of the body the shorter sections of the springs are prevented from flexing independently one of the other.

In testimony whereof, I have signed my name to this specification, in the presence of two subscribing witnesses.

WILLIAM R. WILLIAMS.

Witnesses:
FRANCES KINREICH,
RAPHAEL R. MURPHY.